(12) United States Patent
Yabu et al.

(10) Patent No.: US 10,337,417 B2
(45) Date of Patent: Jul. 2, 2019

(54) CONTROL UNIT FOR INTERNAL COMBUSTION ENGINE

(71) Applicant: AISIN SEIKI KABUSHIKI KAISHA, Kariya-shi, Aichi (JP)

(72) Inventors: Satoshi Yabu, Anjo (JP); Masaaki Kaneko, Aichi (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 15/556,267

(22) PCT Filed: Mar. 30, 2016

(86) PCT No.: PCT/JP2016/060405
§ 371 (c)(1),
(2) Date: Sep. 6, 2017

(87) PCT Pub. No.: WO2016/159089
PCT Pub. Date: Oct. 6, 2016

(65) Prior Publication Data
US 2018/0238244 A1 Aug. 23, 2018

(30) Foreign Application Priority Data
Apr. 2, 2015 (JP) .................. 2015-076056

(51) Int. Cl.
*F02D 13/02* (2006.01)
*F01L 1/34* (2006.01)
(Continued)

(52) U.S. Cl.
CPC ........ *F02D 13/0249* (2013.01); *F01L 1/3442* (2013.01); *F01L 1/352* (2013.01);
(Continued)

(58) Field of Classification Search
CPC .................................................. F02D 13/0249
See application file for complete search history.

(56) References Cited

U.S. PATENT DOCUMENTS 4,616,606 A    10/1986  Ma
5,924,395 A *   7/1999  Moriya .................... B60K 6/46
                                                              123/90.15
(Continued)

FOREIGN PATENT DOCUMENTS

EP    0 063 038 A2    10/1982
JP    05-248277 A      9/1993
(Continued)

OTHER PUBLICATIONS

U.S. Appl. No. 15/556,275, dated Sep. 6, 2017, Satoshi Yabu et al.
(Continued)

*Primary Examiner* — Mark A Laurenzi
*Assistant Examiner* — Wesley G Harris
(74) *Attorney, Agent, or Firm* — Buchanan Ingersoll & Rooney PC

(57) ABSTRACT

A control unit for an internal combustion engine is configured for suppressing knocking phenomenon with reduction of overlap, while maintaining an opening timing of an exhaust valve at the time of low-rotation, high-load state. A valve opening/closing timing control apparatus includes a phase adjustment mechanism configured to vary a relative rotational phase between a driving side rotary body rotatable in synchronism with a crankshaft of the internal combustion engine and a driven side rotary body rotatable together with an exhaust cam shaft. After an opening timing of the exhaust valve, an advancing operation is effected for displacing the relative rotational phase in the advancing direction relative to the opening timing.

4 Claims, 9 Drawing Sheets

(51) Int. Cl.
*F01L 1/352* (2006.01)
*F01L 1/356* (2006.01)
*F01L 1/344* (2006.01)
*F01L 1/053* (2006.01)

(52) U.S. Cl.
CPC .............. *F01L 1/356* (2013.01); *F02D 13/02* (2013.01); *F02D 13/0261* (2013.01); *F01L 2001/0537* (2013.01); *F01L 2001/3443* (2013.01); *F01L 2001/34483* (2013.01); *F01L 2250/02* (2013.01); *F01L 2800/00* (2013.01); *F01L 2820/032* (2013.01); *F01L 2820/041* (2013.01); *F01L 2820/042* (2013.01); *F02D 2200/101* (2013.01); *F02D 2200/1002* (2013.01); *Y02T 10/18* (2013.01)

(56) References Cited

U.S. PATENT DOCUMENTS

| | | | |
|---|---|---|---|
| 5,979,380 | A | 11/1999 | Nakadouzono et al. |
| 2002/0092488 | A1* | 7/2002 | Aoyama ............. F01L 13/0021 123/90.16 |
| 2004/0149263 | A1 | 8/2004 | Tanei et al. |
| 2007/0051332 | A1 | 3/2007 | Uehama et al. |
| 2009/0265077 | A1* | 10/2009 | Urushihata ............... F01L 1/34 701/103 |
| 2012/0023935 | A1* | 2/2012 | Pursifull ................ F02M 26/42 60/605.2 |

FOREIGN PATENT DOCUMENTS

| | | |
|---|---|---|
| JP | 10-103030 A | 4/1998 |
| JP | 10-176558 A | 6/1998 |
| JP | 10-227236 A | 8/1998 |
| JP | 2004-239151 A | 8/2004 |
| JP | 2004-293483 A | 10/2004 |
| JP | 2007-71058 A | 3/2007 |
| JP | 2009-257186 A | 11/2009 |

OTHER PUBLICATIONS

International Search Report (PCT/ISA/210) dated Jun. 14, 2016, by the Japanese Patent Office as the International Searching Authority for International Application No. PCT/JP2016/060405.
Written Opinion (PCT/ISA/237) dated Jun. 14, 2016, by the Japanese Patent Office as the International Searching Authority for International Application No. PCT/JP2016/060405.

* cited by examiner

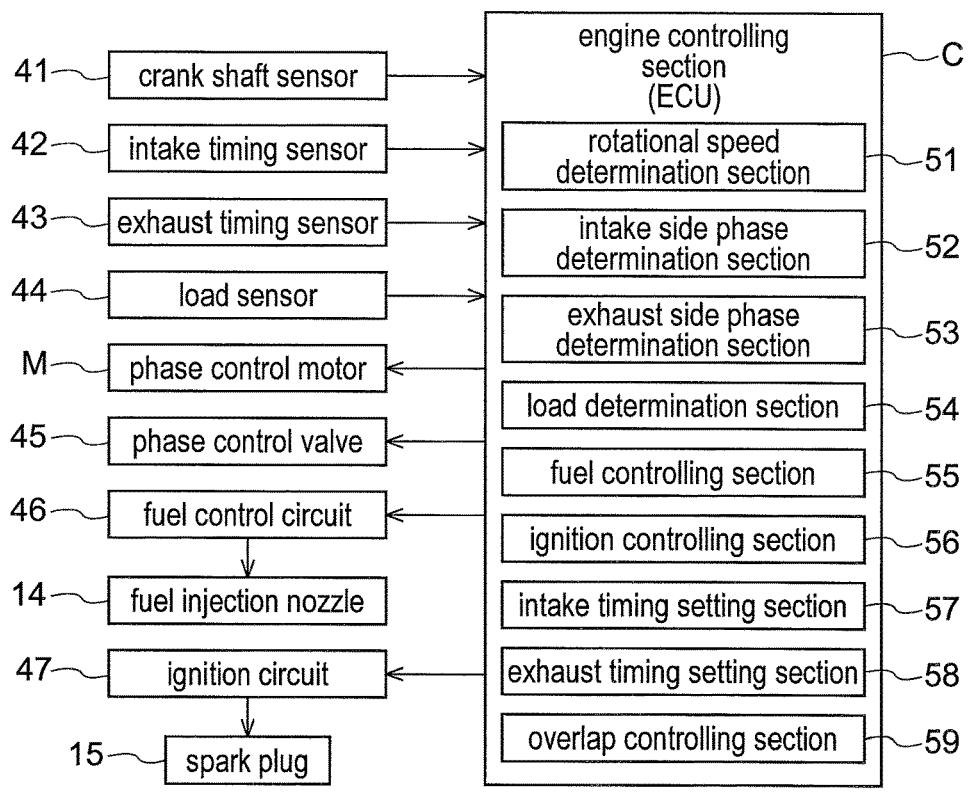
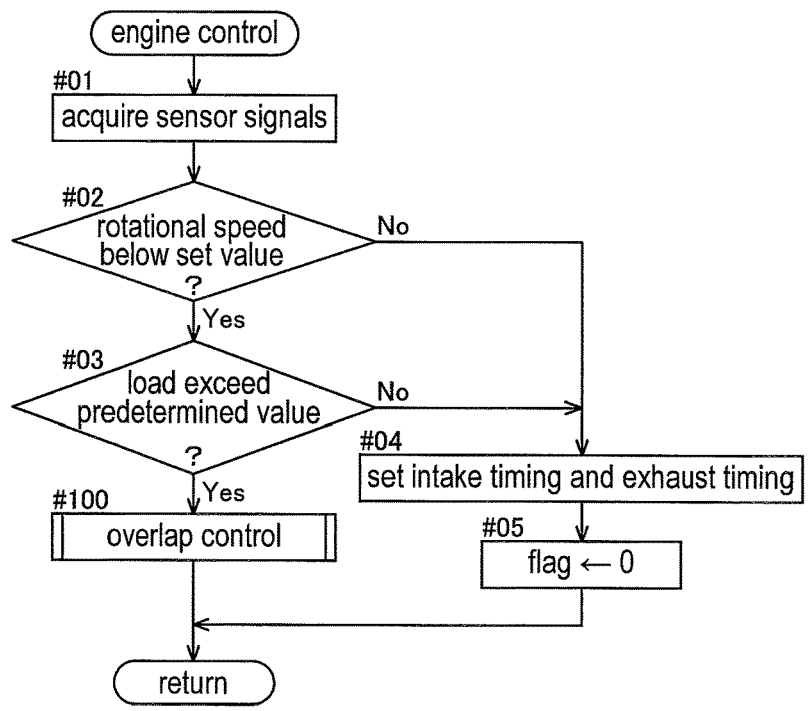

CONTROL UNIT FOR INTERNAL COMBUSTION ENGINE

TECHNICAL FIELD

This invention relates to a control unit for an internal combustion engine, including a valve opening/closing timing control apparatus for setting an opening/closing timing of an exhaust valve of the internal combustion engine.

BACKGROUND ART

Patent Document 1 discloses a technique having a valve opening/closing timing control apparatus (referred to as a "variable valve timing apparatus" in the above document) for setting opening/closing timings of an intake valve and an exhaust valve simultaneously. With this, the technique provides a control according to which when an engine load is below a predetermined value, closing timings of both the intake valve and the exhaust valve are retarded with maintaining an overlap between the intake valve and the exhaust valve constant.

Patent Document 2 discloses a technique having a valve opening/closing timing control apparatus (referred to as an "intake timing varying mechanism" in the above document) for setting an opening/closing timing of an intake valve and a valve opening/closing timing control apparatus (referred to as an "exhaust timing varying mechanism" in the above document) for setting an opening/closing timing of an exhaust valve, and a center timing of an overlap between the intake valve and the exhaust valve is varied according to a load.

Further, Patent Document 3 discloses a technique according to which an overlap when both an intake valve and an exhaust valve are opened simultaneously is set and through adjustment of an amount of this overlap, an internal EGR suitable for an operational condition of an internal combustion engine is obtained. This Patent Document 3 is characterized in that the overlap amount is set based on a guide value corresponding to an operational state of the internal combustion engine.

CITATION LIST

Patent Literature

Patent Document 1: Japanese Unexamined Patent Application Publication Hei. 5-248277
Patent Document 2: Japanese Unexamined Patent Application Publication Hei. 10-176558
Patent Document 3: Japanese Unexamined Patent Application Publication No. 2004-239151

SUMMARY OF INVENTION

Technical Problem

When an internal combustion engine is under a low-rotation, high-load state, knocking can sometimes occur due to spontaneous combustion of air-fuel mixture caused by temperature rise of the air-fuel mixture in a combustion chamber due to the internal EGR by the overlap. Also, the greater the overlap amount, the higher the air-fuel mixture temperature becomes.

For improving this phenomenon, it is conceivable to e.g. decrease the overlap through displacement in an advancing direction of a valve opening/closing timing control apparatus for setting an opening/closing timing for an exhaust valve, thereby to reduce the influence of heat from the internal EGR. However, since the opening timing (EVO) of the exhaust valve is displaced in the advancing direction, the exhaust valve will begin to open before the piston reaches the bottom dead center in the combustion (expansion) stroke, so that the expansion pressure fails to act on the piston sufficiently, thus inviting increase of exhaust gas loss disadvantageously.

For this reason, there is a need for a control unit for an internal combustion engine, which unit can improve performance at the time of low-rotation, high-load state through control of operation of an exhaust valve.

Solution to Problem

According to a characterizing feature of the present invention, a valve opening/closing timing control apparatus includes:

a driving side rotary body rotatable about a rotational axis in synchronism with a crankshaft of an internal combustion engine;

a driven side rotary body mounted rotatably about the same axis as the rotational axis relative to the driving side rotary body, the driven side rotary body being rotatable together with an exhaust cam shaft controlling opening/closing of an exhaust valve of the internal combustion engine; and a phase adjustment mechanism configured to set a relative rotational phase between the driving side rotary body and the driven side rotary body;

the exhaust cam shaft being configured to open/close the exhaust valves of a plurality of cylinders with a predetermined rotational angular spacing therebetween;

after an opening timing of the exhaust valve, an advancing operation being effected to displace the relative rotational phase in an advancing direction relative to the opening timing; and subsequently, the relative rotational phase being displaced in a direction of a retarding operation releasing the advancing operation in order to cause the exhaust valve of another cylinder which is to effect an exhaust operation next to open at an original opening timing.

With the above, for instance, the phase adjustment mechanism allows the valve opening/closing timing control apparatus to effect an advancing operation after the opening timing of the exhaust valve. As a result, the relative rotational phase of the valve opening/closing timing control apparatus is displaced more in the advancing direction than the relative rotational phase at the opening timing, whereby the overlap with the intake valve is reduced. In this however, the influence from the preceding retarding operation is resolved by causing the valve opening/closing timing control apparatus to effect a retarding operation prior to an opening operation of an exhaust valve of a cylinder which is to effect an opening operation of the exhaust valve next. With this arrangement, for the cylinder which is to effect an opening operation of the exhaust valve next, reduction of overlap is possible by repeating the above control.

Therefore, there has been configured a control unit for an internal combustion engine, capable of suppressing the knocking phenomenon at the time of low-rotation, high-load state through reduction of the overlap while maintaining the opening timing of the exhaust valve.

In the present invention, preferably, the phase adjustment mechanism sets the relative rotational phase between the driving side rotary body and the driven side rotary body by an electrically powered actuator; and there is provided a controlling section controlling the electrically powered actuator.

With the above-described arrangement, in comparison with e.g. an arrangement wherein the relative rotational phase is displaced with utilization of a fluid pressure, the valve timing control apparatus configured to displace the relative rotational phase by a driving force of an electrically powered actuator provides an advantage of ability to effect displacement at a high speed. For this reason, as the controlling section controls the electrically powered actuator, an advancing operation and a retarding operation subsequent thereto of the valve opening/closing timing control apparatus, after opening of the exhaust valve, can be effected at high speeds.

In the present invention, preferably, the internal combustion engine is set such that the respective exhaust valves of the plurality of cylinders controlled by the exhaust cam shaft are not opened simultaneously; and a control mode of the controlling section is set such that the retarding operation is initiated from the closing timing of the exhaust valve.

With the above-described arrangement, as a returning operation is started from the closing timing of the exhaust valve, the electrically powered actuator can be driven for the entire period until an opening time of a next cylinder. Thus, earliest possible setting of the closing timing of the exhaust valve is made possible also.

In the present invention, preferably, the controlling section sets a period required for the advancing operation longer than a period required for the retarding operation.

At the time of operation of an internal combustion engine, a cam fluctuation torque is applied to the intake cam shaft in the retarding direction. Therefore, if the period of driving the electrically powered actuator for effecting the advancing operation is set longer than the period of driving the electrically powered actuator for effecting the retarding operation, it becomes possible to effect easily the control for making a displacement amount of the relative rotational phase by the advancing operation equal to a displacement amount of the relative rotational phase by the retarding operation.

In the present invention, preferably:

the control unit further comprises:

a rotational speed sensor detecting a rotational speed per unit time of the crankshaft;

a phase sensor detecting the relative rotational phase; and a load sensor detecting a load applied to an output transmission system from the crankshaft;

wherein the controlling section controls the electrically powered actuator, based on detection results of the rotational speed sensor, the phase sensor and the load sensor, when it is determined from a result of detection of the rotational speed sensor that a rotational speed per unit time of the crankshaft is below a set value.

With the above-described arrangement, in a situation when a rotational speed per unit time of the crankshaft is below a set value, the control for reducing the overlap through control of the electrically powered actuator can be effected only when e.g. the load detected by the load sensor exceeds the predetermined value.

In the present invention, preferably:

the controlling section retards the opening timing of the exhaust valve from a predetermined timing by the retarding operation of the valve opening/closing timing control apparatus.

By retarding the opening timing of the exhaust valve from a predetermined timing as described above, the compression ratio of the air-fuel mixture in the combustion chamber can be further enhanced, thus enabling improvement of the engine output.

BRIEF DESCRIPTION OF DRAWINGS

FIG. 6 is a block diagram of a control system, FIG. 7 is a flowchart of an engine control.

DESCRIPTION OF EMBODIMENTS

Next, one embodiment will be explained with reference to the drawings.

[Basic Configuration]

Figure 1:
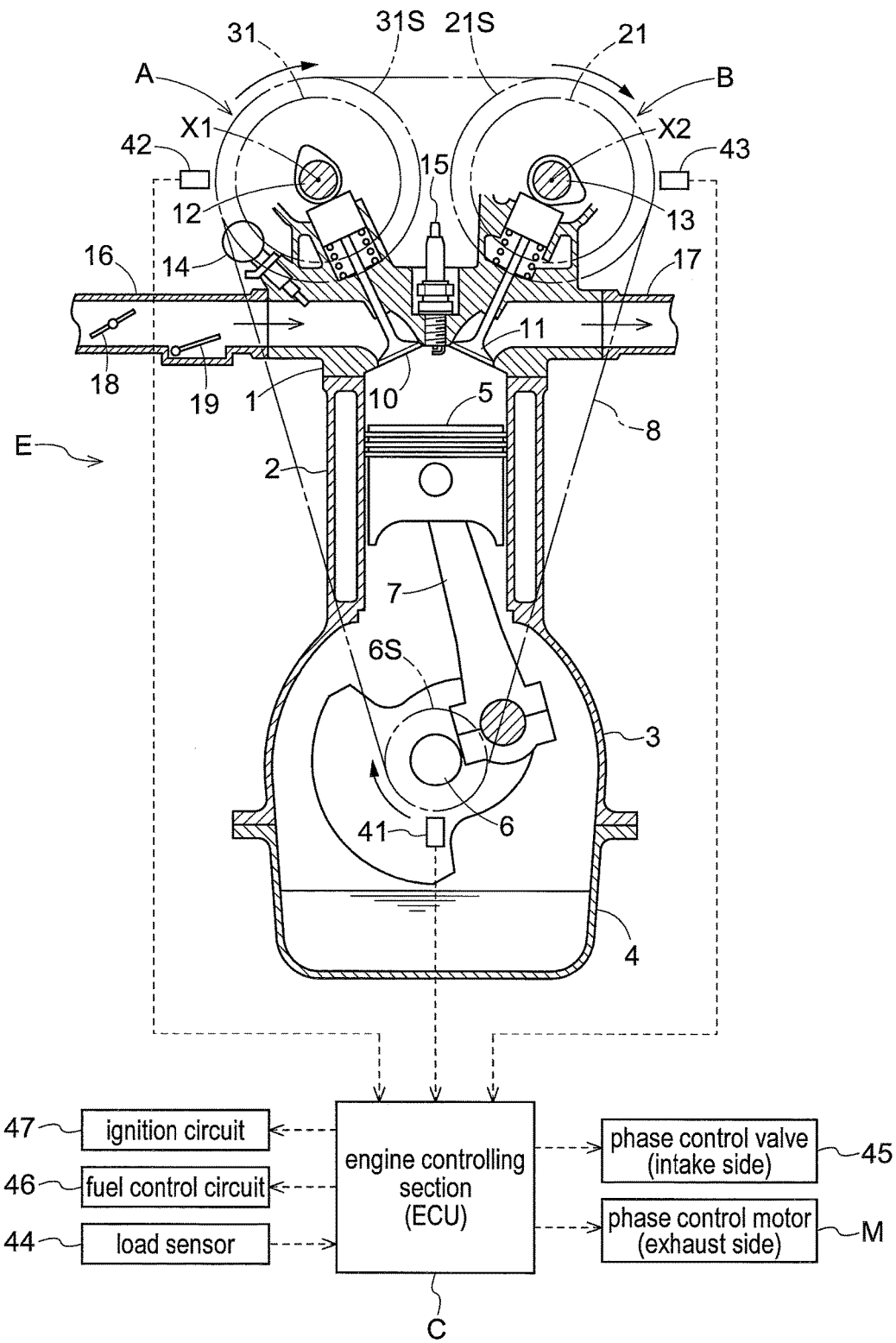
FIG. 1 is a view showing a section of an engine and a block diagram of a control unit.
Figure 2:
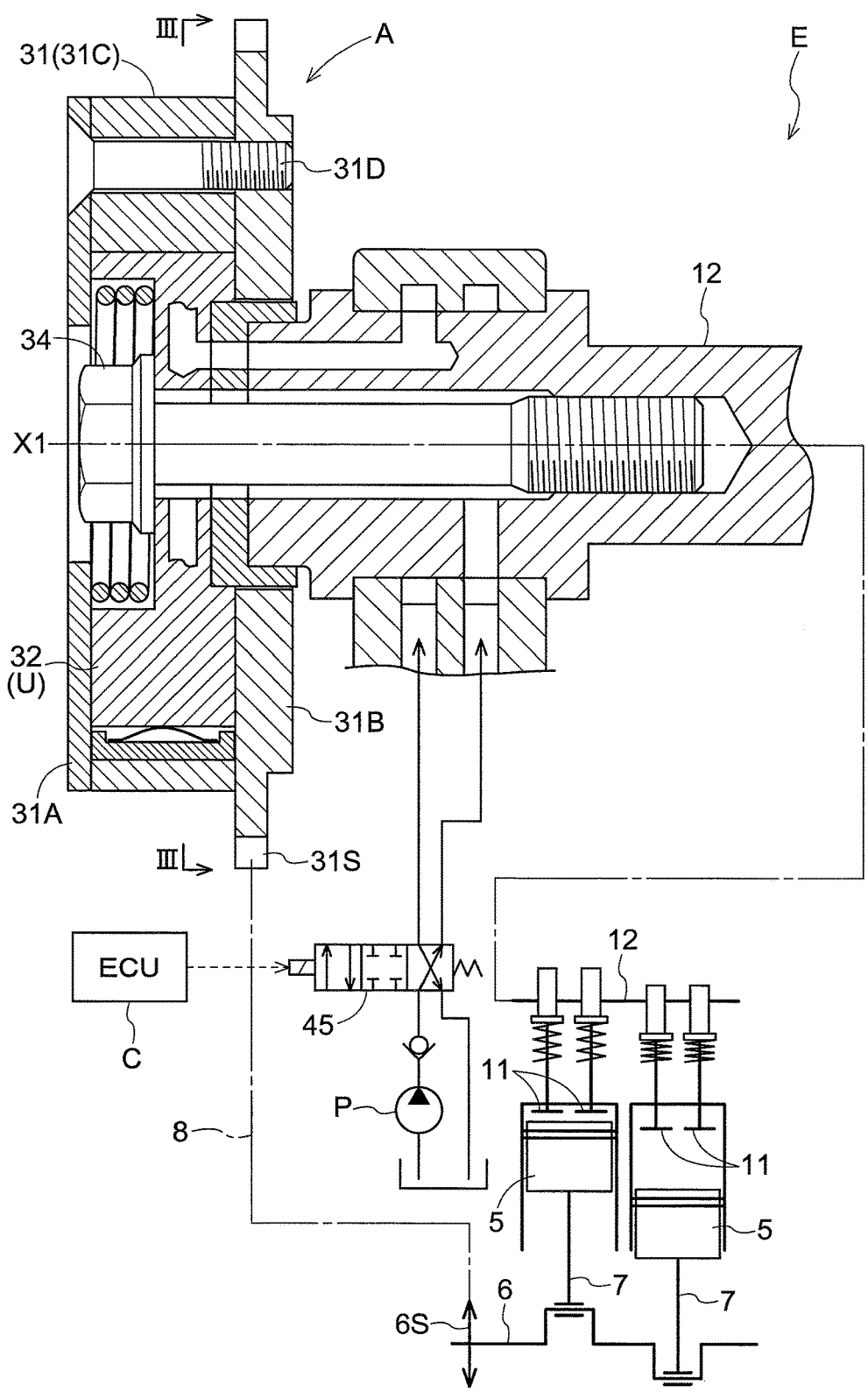
FIG. 2 is a side view in vertical section of an intake side valve opening/closing timing control apparatus.
Figure 4:
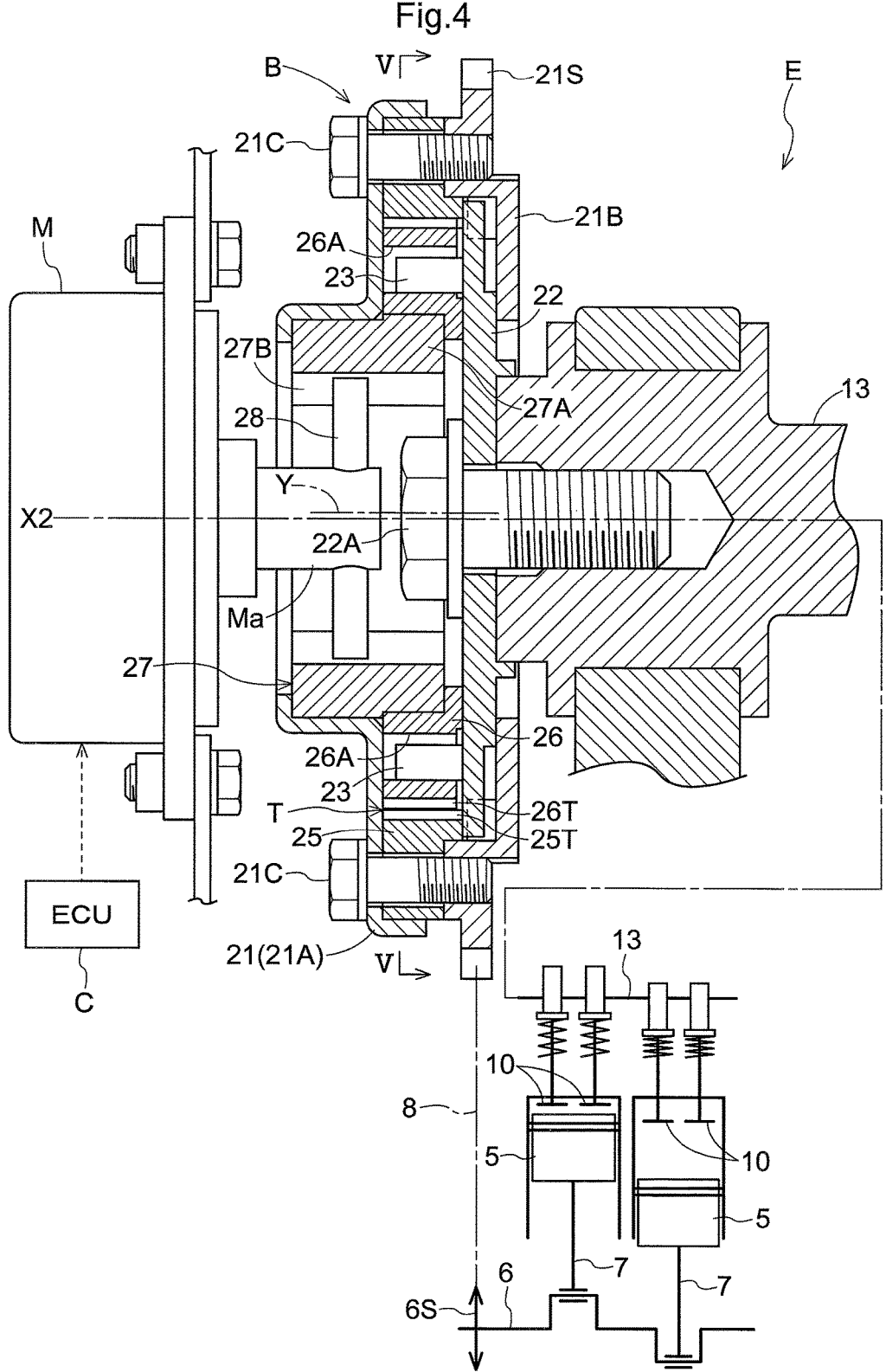
FIG. 4 is a vertical section of an exhaust side valve opening/closing timing control apparatus.

As shown in FIGS. 1, 2 and 4, a control unit for an internal combustion engine is constituted of an intake side valve opening/closing timing control apparatus A for setting an intake timing of an engine E, an exhaust side valve opening/closing timing control apparatus B for setting an exhaust timing of the engine E, and an engine controlling section C for controlling the above apparatuses A, B.

The engine controlling section C controls the intake side valve opening/closing timing control apparatus A and the exhaust side valve opening/closing timing control apparatus B individually, thereby to set optimal intake timing (intake timing) and optimal exhaust timing (exhaust timing) respectively, according to an operational state of the engine E. Simultaneously with the above, the engine controlling section C contemplates reduction of an overlap with maintaining an opening timing EVO of an exhaust valve 11 through control of the exhaust side valve opening/closing timing control apparatus B at the time of low-rotation, high-load state. This control will be described in details later herein.

[Engine]

The engine E is configured as a two-cylinder, four-cycle type, in which a cylinder head 1, a cylinder block 2, a crankcase 3 and an oil pan 4 are vertically superposed and connected to each other. Pistons 5 are accommodated within a plurality of cylinder bores defined in the cylinder block 2. And, a crank shaft 6 rotatably supported to the crankcase 3 and the pistons 5 are connected via a connecting rod 7. Incidentally, although the two-cylinder engine E is shown in FIGS. 2 and 4, the engine E can also have other plurality of cylinders such as three cylinders, four cylinders, etc.

In the cylinder head 1, at a position joining a combustion chamber and an intake passage, an openable/closable intake valve 10 is mounted, and at a position joining the combustion chamber and an exhaust passage, an openable/closable exhaust valve 11 is mounted. Further, upwardly of these, an intake cam shaft 12 and an exhaust cam shaft 13 are provided for opening/closing the intake valve 10 and the exhaust valve 11 independently of each other. On an intake passage side of the cylinder head 1, a fuel injection nozzle 14 is provided, and a spark plug 15 is provided in the combustion chamber.

To a lateral face of the cylinder head 1, an intake manifold 16 connected to a plurality of intake passages and an exhaust manifold 17 connected to a plurality of exhaust passages are connected. Further, inside the intake manifold 16, there are mounted a throttle valve 18 and a tumble control valve 19.

With this engine E, a timing chain 8 is routed and wound around a drive sprocket 6S mounted on the crank shaft 6, an intake side sprocket 31S of the intake side valve opening/closing timing control apparatus A and an exhaust side sprocket 21S of the exhaust side valve opening/closing timing control apparatus B. With this arrangement, a driving force in synchronism with rotation of the crank shaft 6 is transmitted to the intake cam shaft 12 and the exhaust cam shaft 13 and settings of the intake timing by the intake side valve opening/closing timing control apparatus A and the exhaust timing by the exhaust side valve opening/closing timing control apparatus B are realized.

[Intake Side Valve Opening/Closing Timing Control Apparatus]

Figure 3:
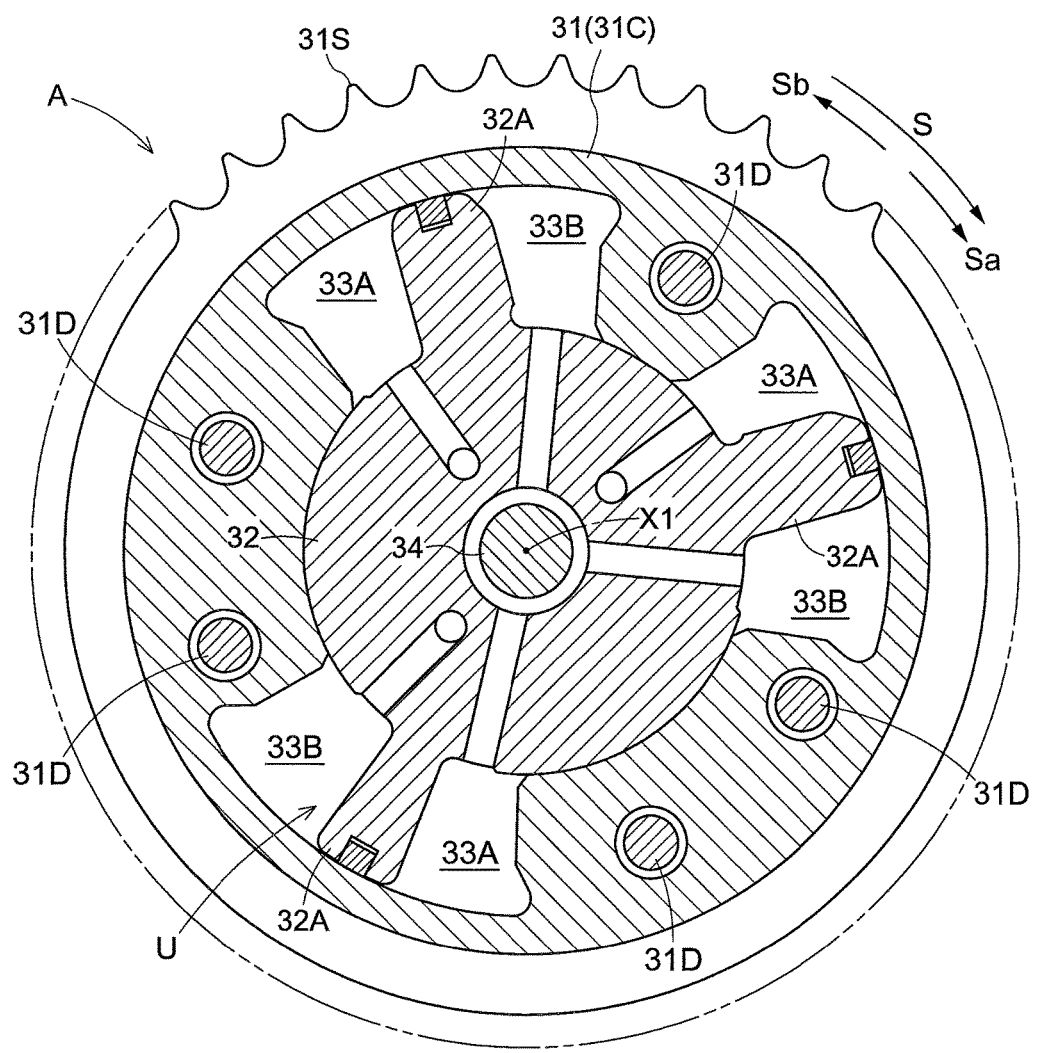
FIG. 3 is a section taken along a line III-III in FIG. 2.

The intake side valve opening/closing timing control apparatus A, as shown in FIGS. 2 and 3, includes an intake side case 31, an intake side rotor 32, and a hydraulic operation mechanism U for setting a relative rotational phase between the intake side case 31 and the intake side rotor 32 by means of an oil pressure.

The intake side case 31 is disposed coaxially with a first axis X1 which constitutes also a rotational axis of the intake cam shaft 12 and forms the intake side sprocket 31S in its outer circumference. This intake side case 31 is configured such that a front plate 31A and a rear plate 31B clamps a rotor body 31C therebetween and these members are fastened to each other with fastener bolts 31D. The intake side rotor 32 is mounted coaxially with the first axis X1 and rotatably relative to the intake side case 31. The intake side rotor 32 is connected to the intake cam shaft 12 with a connecting bolt 34 to be rotatable in unison with the intake cam shaft 12.

As the intake side rotor 32 is enclosed within the intake side case 31, there are formed a plurality of pressure chambers therebetween. The intake side rotor 32 forms a plurality of partitioning portions 32A protruding outwards and as these partitioning portions 32A partition the pressure chambers, advancing chambers 33A and retarding chambers 33B are formed.

With this intake side valve opening/closing timing control apparatus A, when receiving the driving force from the timing chain 8, the entire apparatus A is rotated in a driving rotational direction S. And, a direction of displacement in the same direction as the driving rotational direction S of the relative rotational phase of the intake side rotor 32 relative to the intake side case 31 by the hydraulic operation mechanism U will be referred to as an advancing direction Sa and a displacement in the opposite direction thereto will be referred to as a retarding direction Sb, respectively.

The intake side rotor 32 defines advancing passages communicated to the advancing chambers 33A and retarding passages communicated to the retarding chambers 33B. The engine E includes a hydraulic pump P driven by a driving force of the crank shaft 6 and an electromagnetic type phase control valve 45 for selectively feeding/discharging work oil from the hydraulic pump P to/from the advancing passages and the retarding passages.

The hydraulic pump P is configured to feed a lubricant oil of the oil pan 4 as "work oil" to the phase control valve 45. With position setting of this phase control valve 45, the work oil is fed to the advancing chamber 33A for displacing the relative rotational phase in the advancing direction Sa. Conversely, the work oil is fed to the retarding chamber 33B for displacing the relative rotational phase in the retarding direction Sb. In this way, the hydraulic operation mechanism U is constructed in the hydraulic system for displacing the relative rotational phase by way of oil pressure.

This intake side valve opening/closing timing control apparatus A has an arrangement which is basically same as the technique disclosed in Japanese Unexamined Patent Application Publication Hei. 10-103030, Japanese Unexamined Patent Application Publication Hei. 10-227236, etc. Further, the intake side valve opening/closing timing control apparatus A can be provided with a lock mechanism for locking displacements of the intake side case 31 and the intake side rotor 32 in a predetermined rotational phase.

[Exhaust Side Valve Opening/Closing Timing Control Apparatus]

Figure 5:
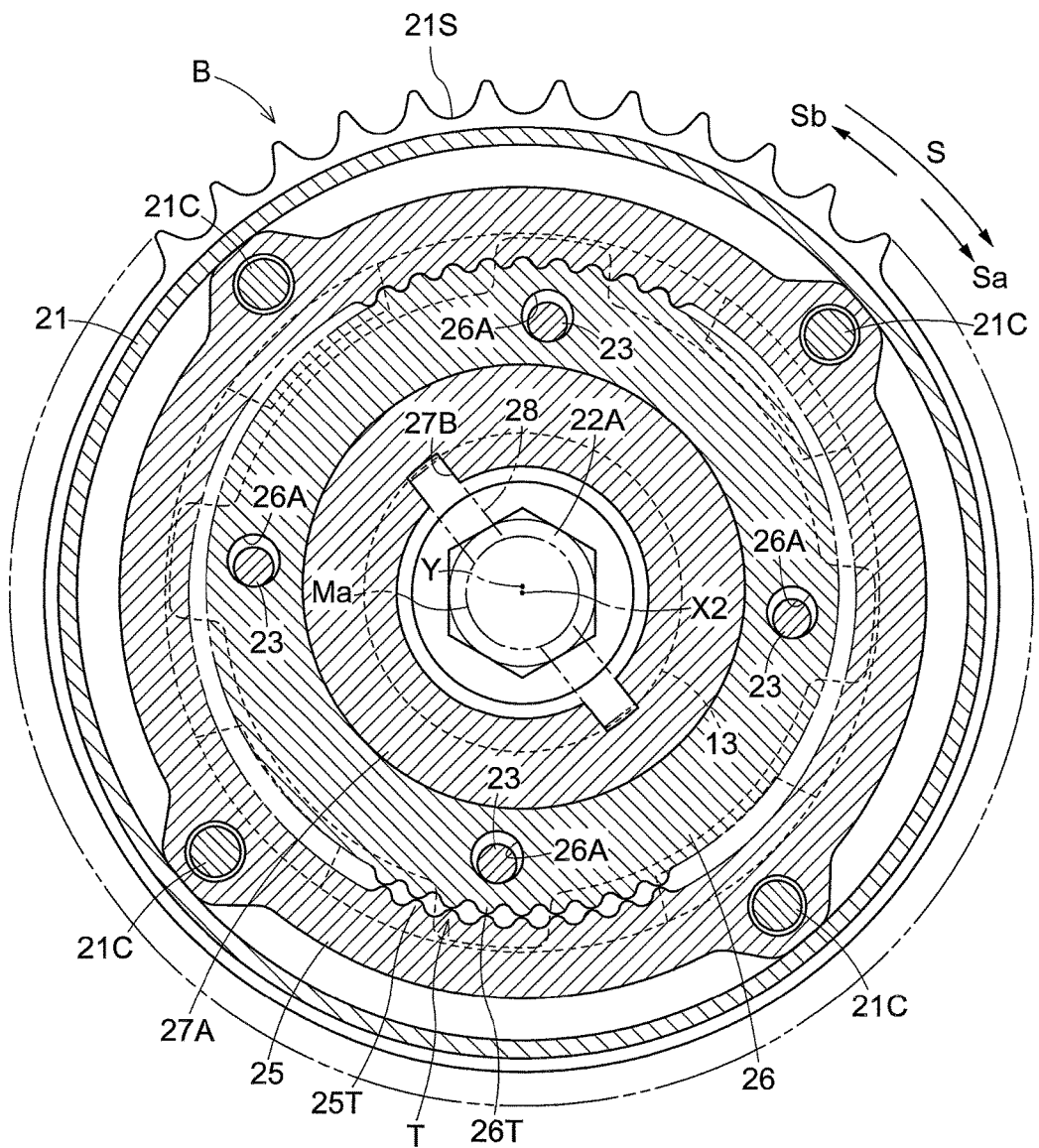
FIG. 5 is a section taken along a line V-V in FIG. 4.

The exhaust side valve opening/closing timing control apparatus B, as shown in FIGS. 4 and 5, includes an exhaust side case 21 (an example of a "driving side rotary body"), an exhaust side rotor 22 (an example of a "driven side rotary body"), and a phase adjustment mechanism T for setting a relative rotational phase between the exhaust side case 21 (an example of the "driving side rotary body") and the exhaust side rotor 22 (an example of the "driven side rotary body") by means of a driving force of a phase control motor M as an "electrically powered actuator". In particular, the phase adjustment mechanism T can alternatively be constituted by using not the phase control motor M as the electrically powered actuator, but an actuator operated by a fluid pressure such as an oil pressure.

The exhaust side case 21 (an example of the "driving side rotary body") is disposed coaxially with a second axis X2 (an example of a "rotational axis") which constitutes also a rotational axis of the exhaust cam shaft 13 and forms the exhaust side sprocket 21S in its outer circumference. This exhaust side case 21 is configured such that a front plate 21A and a rear plate 21B are fastened to each other with fastener bolts 21C. The exhaust side rotor 22 is mounted coaxially with the second axis X2 and rotatably relative to the exhaust side case 21. The exhaust side rotor 22 is connected to the exhaust cam shaft 13 with a connecting bolt 22A to be rotatable in unison with the exhaust cam shaft 13.

With this exhaust side valve opening/closing timing control apparatus B, when receiving the driving force from the timing chain 8, the entire apparatus B is rotated in the driving rotational direction S. And, a direction of displacement in the same direction as the driving rotational direction S of the relative rotational phase of the exhaust side rotor 22 relative to the exhaust side case 21 by the driving force of the phase control motor M will be referred to as the advancing direction Sa and a displacement in the opposite direction thereto will be referred to as the retarding direction Sb, respectively.

The phase adjustment mechanism T includes a ring gear 25 rotatable together with the exhaust side case 21 and has a plurality of inner tooth portions 25T, an inner gear 26 having a plurality of outer tooth portions 26T to be meshed therewith, and an eccentric cam body 27. Further, the exhaust side rotor 22 includes a plurality of linking members 23 projecting in form of shafts.

The ring gear 25 is configured as an inner tooth gear having a predetermined number of inner tooth portions 25T. The inner gear 26 is configured as an outer tooth gear that has outer tooth portions 26T which are fewer in number than the teeth of the ring gear 25 and defines a hole portion at the center thereof. This inner gear 26 defines a plurality of linking hole portions 26A having a greater diameter than the linking members 23. As the linking member 23 is inserted into the linking hole portion 26A, this arrangement functions as a shaft joint. Instead of this arrangement, an Oldham coupling, etc. can also be employed.

The eccentric cam body 27 comprises an integral formation consisting of a cylindrical cam body disposed coaxially with the second axis X2 and a cam portion 27A formed cylindrical about an eccentric axis Y which is eccentric relative to the cam body. With this exhaust side valve opening/closing timing control apparatus B, the cam body is supported to be rotatable about the second axis X2 relative to the exhaust side case 21 and the cam portion 27A is rotatably fitted within the hole portion of the inner gear 26.

In the phase control motor M, an engaging pin 28A supported to the engine E and mounted under a perpendicular posture relative to an output shaft Ma is engaged in an engaging groove 27B of the eccentric cam body 27. Incidentally, a brushless motor is used as the phase control motor M. Instead of this, a synchronous motor such as a stepping motor, etc. can be used also.

With the above-described arrangement, in case the eccentric cam body 27 is rotated by the driving force of the phase control motor M, the cam portion 27A is rotated about the second axis X2, whereby the inner gear 26 starts revolving about the second axis X2. At the time of this revolving, meshing position between the outer tooth portion 26T of the inner gear 26 and the inner tooth portion 25T of the ring gear 25 is displaced along the inner circumference of the ring gear 25, whereby the inner gear 26 is rotated slightly about the eccentric axis Y of its own.

Further, in case the inner gear 26 has revolved only for one revolution, the inner gear 26 is rotated (rotated about its own axis) relative to the ring gear 25 by an angle corresponding to the difference of number of teeth between the number of the inner tooth portions 25T of the ring gear 25 and the number of the outer tooth portions 26T of the inner gear 26, so a large speed reduction is realized. Although this rotation of inner gear 26 does not take place about the second axis X2, this rotation is transmitted to the exhaust side rotor 22 via the linking members 23 fitted into the linking hole portions 26A. As a result, there is realized a displacement of the relative rotational phase of the exhaust side rotor 22 relative to the exhaust side case 21. Incidentally, the gear arrangement of the phase adjustment mechanism T is not limited to the arrangement shown in FIG. 4 and FIG. 5.

With this exhaust side valve opening/closing timing control apparatus B, as the output shaft Ma of the phase control motor M is driven to rotate in the same direction and with an equal speed as/to the rotational speed of the exhaust cam shaft 13, the relative rotational phase is maintained. Further, control mode is set such that the relative rotational phase is displaced in the advancing direction Sa or the retarding direction Sb through increase or decrease of the rotational speed of the phase control motor M. The displacement direction (either the advancing direction Sa or the retarding direction Sb) of the relative rotational phase relative to increase or decrease in the rotational speed of the phase control motor M is determined by the gear arrangement of the phase adjustment mechanism T.

In particular, since the relative rotational phase is displaced by means of the driving force of the phase control motor M, a high speed operation is possible, in comparison with an arrangement of realizing the displacement by means of an oil pressure and this displacement of the relative rotational phase can be effected at an extremely high speed.

This exhaust side valve opening/closing timing control apparatus B has an arrangement which is basically same as the technique disclosed in Japanese Unexamined Patent Application Publication 2007-71058, Japanese Unexamined Patent Application Publication 2009-257186, etc. Further, the configuration of the exhaust side valve opening/closing timing control apparatus B is not particularly limited to the configuration described in the above embodiment or those disclosed in the above-identified publications, as long as the relative rotational phase between the exhaust side case 21 and the exhaust side rotor 22 is displaced by means of a driving force of an electrically powered actuator.

[Controlling Arrangement]

The engine controlling section C functions as an ECU for managing an operational state of the engine E and, as shown FIG. 1 and FIG. 6, inputs signals from a crank shaft sensor 41 (an example of a "rotational speed sensor"), an intake timing sensor 42 (an example of a "phase sensor"), an exhaust timing sensor 43 (another example of a "phase sensor"), and a load sensor 44. Further, the engine controlling section C outputs control signals to the phase control motor M for realizing displacement of the relative rotational phase of the exhaust side valve opening/closing timing control apparatus B, the phase control valve 45 for realizing the displacement of the intake side valve opening/closing timing control apparatus A, a fuel control circuit 46 for controlling the fuel injection nozzle 14, and an ignition circuit 47 for controlling the spark plug 15.

The crank shaft sensor 41 used herein comprises a pickup type, etc. so as to output a detection signal when the crank shaft 6 reaches a predetermined rotational phase. And, by counting such detection signals, detection of the rotational speed (rotational sped per unit time) of the crank shaft 6 is made possible. The intake timing sensor 42 used herein comprises a pickup type, etc. so as to output a detection signal when the intake side rotor 32 reaches a predetermined rotational phase. The exhaust timing sensor 43 used herein comprises a pickup type, etc. so as to output a detection signal when the exhaust side rotor 22 reaches a predetermined rotational phase. The load sensor 44 detects a torque which acts on the crank shaft 6. Incidentally, the load sensor 44 is not limited to the arrangement of detecting a load acting on a driving system, but can also be arranged to determine that the higher the load, the greater the opening degree of the throttle valve 18 based on a signal that detects an opening degree of the throttle valve 18.

Incidentally, when a relative rotational phase of the intake side valve opening/closing timing control apparatus A (or the exhaust side valve opening/closing timing control apparatus B) is to be acquired, there is executed an operation of e.g. calculating a time difference between the detection timing of the crank shaft sensor 41 and the detection timing of the intake timing sensor 42 (or the exhaust timing sensor 43) or referring to a table data based on such time difference.

The engine controlling section C includes a rotational speed determination section 51, an intake side phase determination section 52, an exhaust side phase determination section 53, a load determination section 54, a fuel controlling section 55, an ignition controlling section 56, an intake timing setting section 57, an exhaust timing setting section 58, and an overlap controlling section 59. It is originally assumed that these sections are constituted of software. However, these can be constituted of hardware formed of circuits having logic, etc. or can be combination of software and hardware.

The rotational speed determination section 51 determines a rotational speed (rotational speed per unit time) of the crank shaft 6 by counting signals from the crank shaft sensor 41. The intake side phase determination section 52 determines relative rotational phase of the intake side valve opening/closing timing control apparatus A, based on relationship between the detection timing of the signal of the crank shaft sensor 41 and the detection timing of the signal at the intake timing sensor 42. Similarly, the exhaust side phase determination section 53 determines relative rotational phase of the exhaust side valve opening/closing timing control apparatus B, based on relationship between the detection timing of the signal of the crank shaft sensor 41 and the detection timing of the signal at the exhaust timing sensor 43. The load determination section 54 determines a load acting on the engine E, based on detection signals of the load sensor 44.

The fuel controlling section 55 sets a feeding timing of fuel, based on detection signals from the crank shaft sensor 41 and the intake timing sensor 42 and causes the fuel injection nozzle 14 to inject fuel through the fuel control circuit 46.

The ignition controlling section 56 sets ignition timings of a plurality of spark plugs 15 based on detection signals from the crank shaft sensor 41 and the intake timing sensor 42, thus driving the spark plugs 15 via the ignition circuit 47, for realizing ignitions.

The intake timing setting section 57 sets a target rotational phase based on an operational state of the engine E and sets a relative rotational phase of the intake side valve opening/closing timing control apparatus A through control of the phase control valve 45. At the time of this control, as the work oil from the hydraulic pump P is fed to the advancing chamber 33A and the work oil is discharged from the retarding chamber 33B, the relative rotational phase is displaced in the advancing direction. Conversely, as the work oil is fed to the retarding chamber 33B and the work oil is discharged from the advancing chamber 33A, the relative rotational phase is displaced in the regarding direction. Incidentally, in case the relative rotational phase is to be maintained, feeding and discharging of work oil are stopped by the phase control valve 45.

The exhaust timing setting section 58 sets a target rotational phase based on an operational state of the engine E and sets a relative rotational phase of the exhaust side valve opening/closing timing control apparatus B through control of the phase control motor M. At the time of this control, as described above, the relative rotational phase is maintained by causing the phase control motor M to be rotated at an equal speed to the exhaust cam shaft 13 and with speed increase or speed decreases from this speed, displacement of the relative rotational phase in the advancing direction or the retarding direction is realized.

The overlap controlling section 59 realizes a control for reduction of the overlap without shifting the opening timing of the exhaust valve 11 in the advancing direction, in case the rotational speed of the engine E is below a predetermined value and a load detected by the load sensor 44 exceeds a predetermined value.

[Controlling Mode]

An overview of the controlling mode of the engine E by the engine controlling section C is shown in the form of a flowchart in FIG. 7 as an engine controlling routine. In this control, if the rational speed is determined as below the predetermined value based on detection result of the crank shaft sensor 41 and the load is determined to exceed the predetermined value based on the detection result of the load sensor 44 (steps #01-03), the process moves onto the overlap control routine (step #10). Conversely, if the load does not exceed the set value, the process sets the intake timing by the intake side valve opening/closing timing control apparatus A based on the acquired information and sets the exhaust timing by the exhaust side valve opening/closing timing control apparatus B, thus setting "0" at flag (steps #04, #05).

Figure 9:
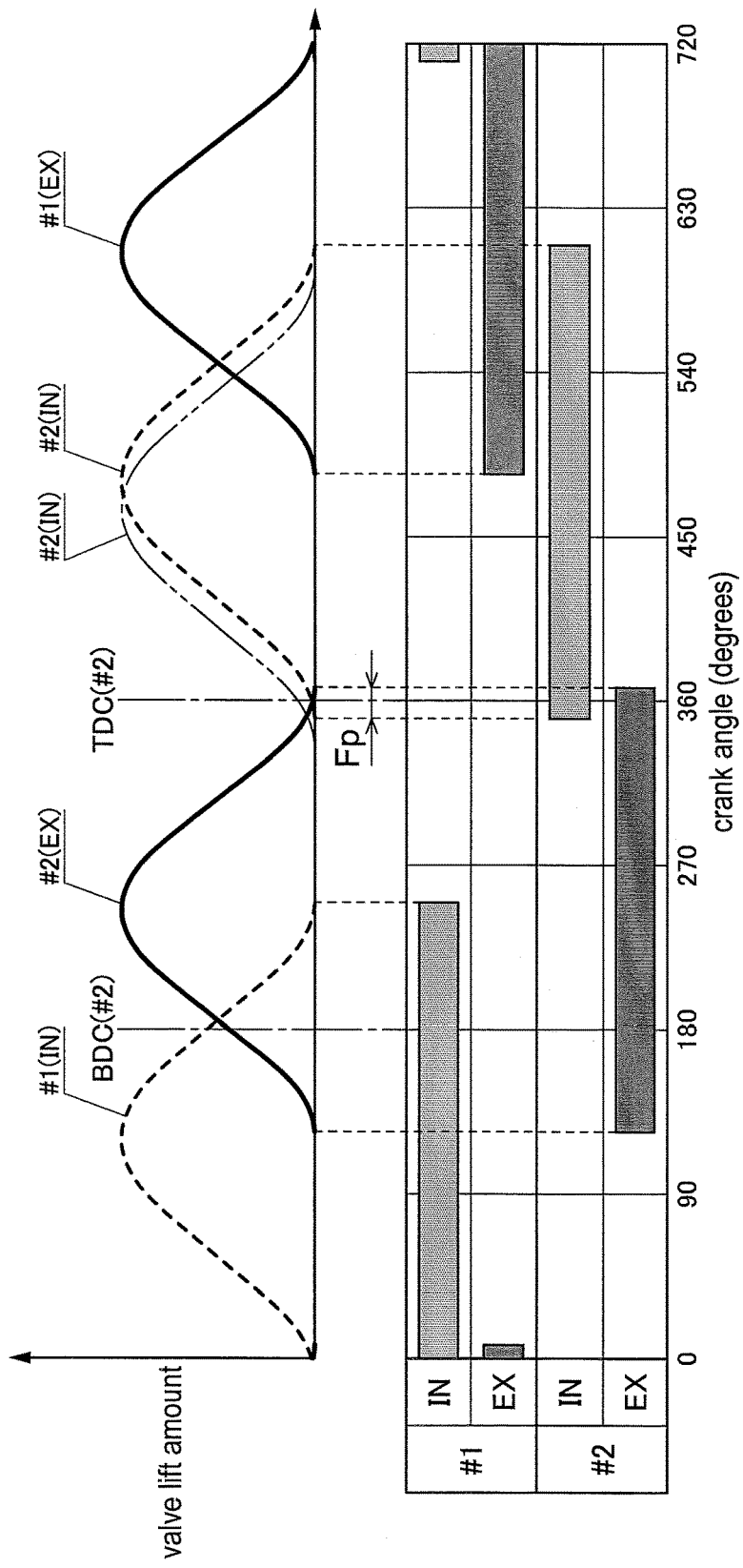
FIG. 9 is a chart showing valve lift curves and regions of opening/closing operations of an exhaust valve and an intake valve of two cylinders.

An example of the control at step #04 is illustrated in the flowchart shown in FIG. 9. The engine E is configured as two-cylinder type engine. While the exhaust cam shaft 13 effects 720 degree rotation (two rotations), the exhaust valves 11 of the respective cylinders will be opened/closed by the timings set for the two cylinders. Namely, in the first cylinder #1 and the second cylinder #2, intake, compression, combustion (expansion) and exhaust are effected.

Further, in the chart shown in FIG. 9, a crank angle is represented by the horizontal axis and lift amounts of the intake valve 10 and the exhaust valve 11 are represented by the vertical axis. In the drawing, an exhaust valve lift curve EX (solid line) and an intake valve lift curve IN (broken line) directly reflect cam profiles of the intake cam shaft 12 and the exhaust cam shaft 13, respectively.

The terminal end portion of the exhaust valve lift curve EX is overlapped with a top dead center TDC of the piston 5, and the starting end portion of the intake valve lift curve IN is also overlapped with the top dead center TDC of the piston 5. And, the exhaust valve lift curve EX and the intake valve lift curve IN are overlapped in a region Fp (initial overlap Fp).

For instance, when the rotational speed of the engine E exceeds the predetermined value, if the relative rotational phase of the intake side valve opening/closing timing control apparatus A is displaced in the advancing direction based on a load detected by the load sensor 44, the intake valve lift curve IN is shifted to the left side as indicated by a virtual line (two-dot chain line), thus advancing the intake timing. Further, though not shown in the drawing, if the relative rotational phase of the intake side valve opening/closing timing control apparatus A is displaced in the retarding direction based on a load detected by the load sensor 44, the intake valve lift curve IN is shifted to the right side in the same drawing, thus retarding the intake timing. With this control, an operation of the engine E with the optimal fuel consumption or with required torque is realized.

The overlap control (step #100) is realized by control of the overlap controlling section 59, according to which the overlap between the exhaust valve 11 and the intake valve 10 is decreased with maintaining the opening timing EVO for the exhaust valves 11 of all of the cylinders (two cylinders).

Figure 10:
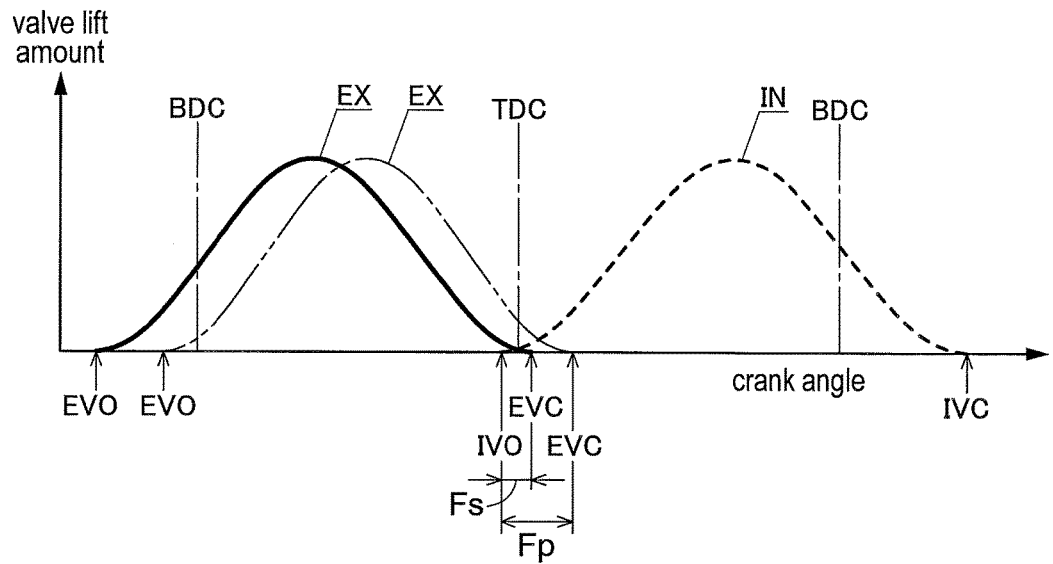
FIG. 10 is a chart for explaining intake timing of the exhaust valve and the intake valve.

Namely, FIG. 10 illustrates the exhaust valve lift curve EX and the intake valve lift curve IN in the case of opening/closing according to the cam profiles while the respective rotational phases of the exhaust side valve opening/closing timing control apparatus B and the intake side valve opening/closing timing control apparatus A are maintained at predetermined phases, and the overlapped region therebetween is shown as the initial overlap Fp.

FIG. 10 shows, in the form of the virtual line (two-dot chain line), the exhaust valve lift curve EX which opens/closes according to the cam profile in case the relative rotational phase of the exhaust side valve opening/closing device B is maintained to the predetermined phase. Further, this also illustrates a case when the exhaust valve lift curve EX is displaced to the advancing side as shown by a solid line, when, upon reaching the low rotation, high load state, the relative rotational phase of the exhaust side valve opening/closing device B is displaced in the advancing direction.

With the above arrangement, by shifting the exhaust valve lift curve EX in the advancing direction (to the left side in the illustration), the exhaust valve lift curve EX is overlapped with the intake valve lift curve IN by an extremely small region Fs (reduced overlap Fs), thereby to eliminate influence of heat from the internal EGR, thus realizing suppression of knocking phenomenon. Incidentally, in the overlap control (step #100), the exhaust valve lift curve EX indicated by the solid line in the illustration will not appear.

Incidentally, it is also conceivable to shift the exhaust valve lift curve EX further in the advancing direction than the position indicated by the solid line, thereby to eliminate the overlap entirely (displacing EVC in the advancing direction more than IVO). In the case of such elimination of overlap, the influence of heat from the internal EGR can be removed more effectively to enable more effective suppression of knocking phenomenon.

However, in case the relative rotational phase of the exhaust side valve opening/closing device B is displaced in the advancing direction, as shown by the solid line in FIG. 10, the exhaust valve lift curve EX as a whole is shifted in the advancing direction, so the opening timing EVO too is displaced in the advancing direction. With this, in the combustion (expansion) stroke immediately before this exhaust stroke, the exhaust valve 11 will be opened before the piston 5 reaches a bottom dead center BDC, so that the expansion pressure in the combustion stroke will fail to act on the piston 5 sufficiently, thus increasing exhaust loss.

Figure 11:
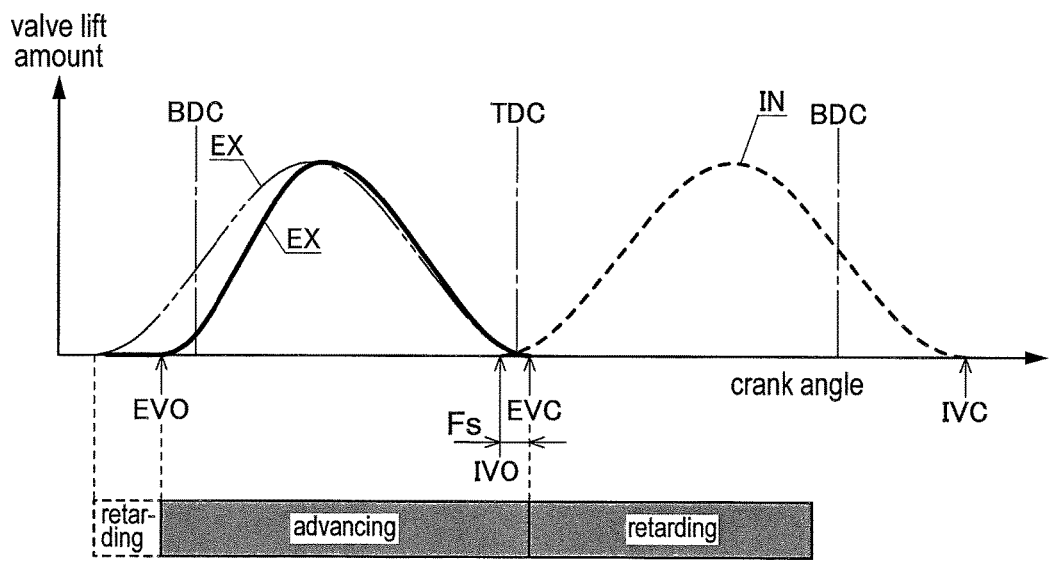
FIG. 11 is a chart showing timings of an advancing operation and a retarding operation by the exhaust side valve opening/closing timing control apparatus in the overlap control.

In order to resolve the above inconvenience, in the overlap control routine (step #100), as indicated by a solid line in FIG. 11, the opening timing EVO is maintained by displacing a front half side of the exhaust valve lift curve EX in the retarding direction.

Figure 8:
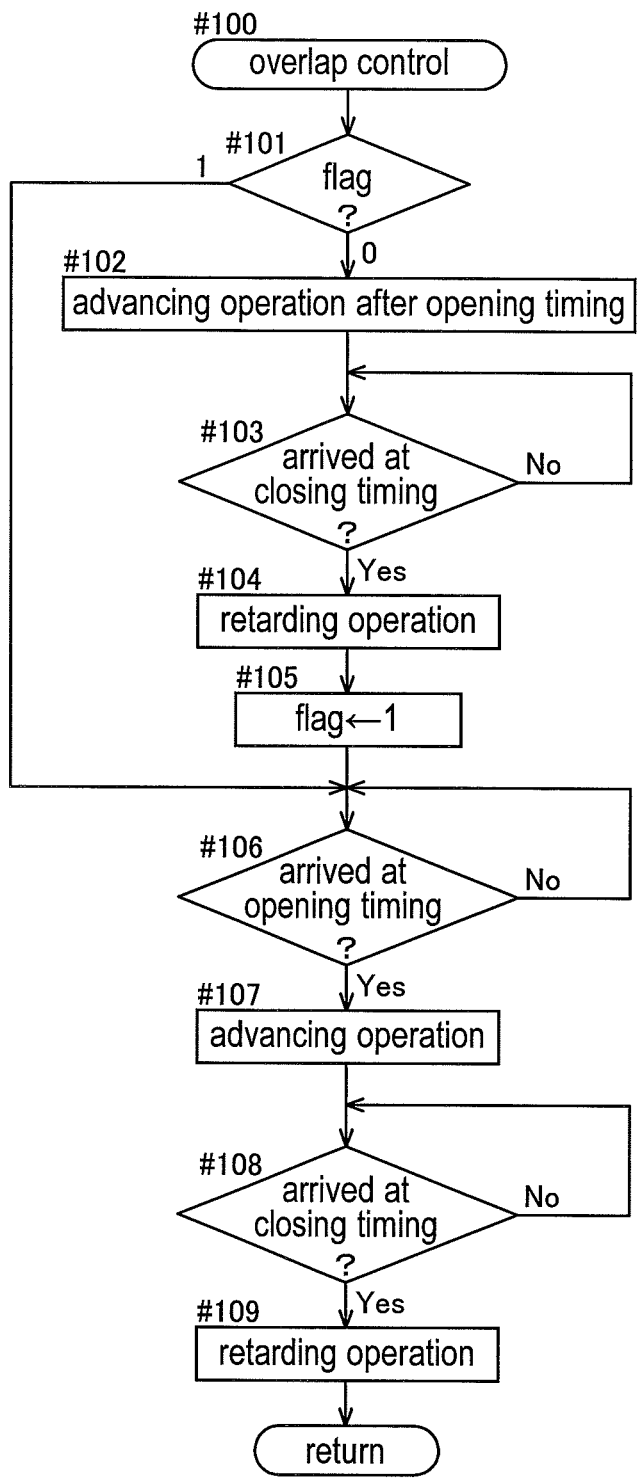
FIG. 8 is a flowchart of an overlap control.

Namely, in the overlap control routine (step #100) shown in FIG. 8, a sensor signal is acquired from the crank shaft sensor 41 and if the flag is set to "0", after arrival at the opening timing EVO of the exhaust valve 11, an advancing operation of the exhaust side valve opening/closing timing control apparatus B is effected through control of the speed of the phase control motor M. In succession thereto, a retarding operation is started after the exhaust valve 11 reaches the closing timing and "1" is set to the flag (steps #101-#105).

These steps #101-#105 constitute initial control. In this, it is assumed that the relative rotational phase of the exhaust side valve opening/closing timing control apparatus B is at a standard phase in which the cam profile of the exhaust cam shaft 13 as it is reflects the opening timing EVO and the closing timing EVC. Therefore, after the exhaust valve 11 reaches the opening timing EVO of the exhaust valve lift curve EX indicated by the virtual line (two-dot chain line) in FIG. 10, the relative rotational phase of the exhaust side valve opening/closing timing control apparatus B is displaced in the advancing direction, whereby the region of the exhaust valve lift curve EX after the opening timing EVO is shifted to the advancing side. With this, reduction or elimination of the overlap with maintaining the opening timing EVO of the exhaust valve lift curve EX is realized.

Further, as the retarding operation is started after the exhaust valve 11 reaches the closing timing EVC, in the cylinder where exhaust is take place next and in the cylinder where the initial control has been effected, the exhaust valve 11 can be opened at the original timing, upon arrival of the exhaust valve 11 at the opening timing EVO.

After this initial control, the flag is set to "1". So, after the exhaust valve 11 reaches the opening timing EVO, there is effected control in repetition in which the relative rotational phase of the exhaust side valve opening/closing timing control apparatus B is displaced in the advancing direction from the standard phase and then the retarding operation is returned to the standard phase after the exhaust valve 11 reaches the closing timing EVC (steps #106-#109).

Namely, in this control, the initial control of steps #102-#105 is effected once only. And, after execution of this initial control, the operation of displacing the relative rotational phase in the advancing direction Sa and the operation of displacing it in the retarding direction Sb are effected in alternation. By executing such control as above, in the exhaust valve lift curve EX (the solid line in FIG. 11), the front half portion thereof is displaced n the retarding direction and the rear half portion thereof is displaced in the advancing direction. Therefore, in comparison with the exhaust valve lift curve EX where the exhaust valve 11 is opened according to the cam profile, the width of the exhaust valve lift curve EX set by the control is narrowed as a whole.

Incidentally, during an operation of the engine E, a cam fluctuation torque is applied in the advancing direction from the exhaust cam shaft 13. Thus, in comparison with the speed of displacement in the advancing direction, the speed of displacement in the retarding direction is made higher. In this control, an operational amount of the phase control motor M in the advancing direction is set equal to an operational amount of the phase control motor M in the retarding direction. However, in consideration to the effect of the cam fluctuation torque, the driving period of the phase control motor M in the advancing direction is set longer than the driving period thereof in the retarding direction. Incidentally, it is also possible to effect a duty control such that an electric power for the advancing operation of the phase control motor M may be set greater than an electric power for the retarding operation of the same.

[Function/Effect of Embodiment]

The exhaust side valve opening/closing timing control apparatus B using the electrically powered phase control motor M is capable of effect displacement in the advancing direction and displacement in the retarding direction by short interval, when the engine E is under a low rotational speed state. With utilization of this advantage, in a situation of the engine E being at a low rotational speed, if it is determined that the load detected by the load sensor 44 exceeds the predetermined value, during the unit period from the opening timing EVO to the closing timing EVC of the exhaust valve 11, the relative rotational phase of the exhaust side valve opening/closing timing control apparatus B is displaced in the advancing direction first and then displaced in the retarding direction.

Thanks to the above-described control, in case the engine E is in a situation of low-speed, high-load, by reducing the overlap to set the reduced overlap Fs, the adverse effect of heat from the internal EGR is eliminated and suppression of knocking phenomenon is realized. Moreover, in the combustion (expansion) stroke, the pressure associated with combustion is received by the piston 5 without loss, thus realizing operation without exhaust loss.

[Other Embodiments]

Other configurations than that of the foregoing embodiment are also possible as follows.

(a) As the intake side valve opening/closing timing control apparatus A, like the exhaust side valve opening/closing timing control apparatus B, it is possible to employ a configuration that allows displacement of the relative rotational phase by means of the phase control motor M. With this configuration, displacements of the relative rotational phase of the intake side valve opening/closing timing control apparatus A can be effected at a high speed. Also, the passages and the control value required for feeding/discharging of work oil can be omitted.

(b) As the control for low-rotation, high-load, there can be set a mode of control according to which the opening timing EVO of the exhaust valve 11 is retarded from the timing shown in FIG. 11, through control of displacing the relative rotational phase of the intake side valve opening/closing timing control apparatus A in the retarding direction Sb. With this setting, the compression ratio of the combustion chamber can be further increased, thus allowing improvement in the output of the engine E.

(c) Both the intake side valve opening/closing timing control apparatus A and the exhaust side valve opening/closing timing control apparatus B can include a mechanism for adjusting the valve lift amount.

(d) In order to control a residual gas amount which is a factor causing knocking phenomenon, knocking improvement systems such as a cooled EGR, the tumble control valve 19 or the 4-2-1 exhaust system can be used in combination. With such combinational use, more effective knocking suppression is made possible.

INDUSTRIAL APPLICABILITY

The present invention can be used in an internal combustion engine having an exhaust cam shaft equipped with a valve opening/closing timing control apparatus.

REFERENCE SIGNS LIST

6: crank shaft
11: exhaust valve
13: exhaust cam shaft
21: driving side rotary body (exhaust side case)
22: driven side rotary body (exhaust side rotor)
41: rotational speed sensor (crank shaft sensor)
44: load sensor
B: valve opening/closing timing control apparatus (exhaust side valve opening/closing timing control apparatus)
C: controlling section
E: internal combustion engine (engine)
M: electrically powered actuator (phase control motor)
T: phase adjustment mechanism
X2: rotational axis (second axis)
EVO: opening timing
EVC: closing timing

The invention claimed is:

1. A control unit for an internal combustion engine, comprising:
a valve opening/closing timing control apparatus including:
a driving side rotary body rotatable about a rotational axis in synchronism with a crankshaft of an internal combustion engine;
a driven side rotary body mounted rotatably about the same axis as the rotational axis relative to the driving side rotary body, the driven side rotary body being rotatable together with an exhaust cam shaft controlling opening/closing of an exhaust valve of the internal combustion engine; and
a phase adjustment mechanism configured to set a relative rotational phase between the driving side rotary body and the driven side rotary body;
the exhaust cam shaft being configured to open/close the exhaust valves of a plurality of cylinders with a predetermined rotational angular spacing therebetween;
after an opening timing of the exhaust valve, an advancing operation being effected to displace the relative rotational phase in an advancing direction relative to the opening timing; and
subsequently, the relative rotational phase being displaced in a direction of a retarding operation releasing the advancing operation in order to cause the exhaust valve of another cylinder which is to effect an exhaust operation next to open at an original opening timing, wherein:
the phase adjustment mechanism sets the relative rotational phase between the driving side rotary body and the driven side rotary body by an electrically powered actuator,
there is provided a controlling section controlling the electrically powered actuator, and
the controlling section sets a period required for the advancing operation longer than a period required for the retarding operation.

2. The control unit for an internal combustion engine of claim 1, wherein:
the internal combustion engine is set such that the respective exhaust valves of the plurality of cylinders controlled by the exhaust cam shaft are not opened simultaneously; and
a control mode of the controlling section is set such that the retarding operation is initiated from the closing timing of the exhaust valve.

3. The control unit for an internal combustion engine of claim 1, wherein:
the control unit further comprises:
a rotational speed sensor detecting a rotational speed per unit time of the crankshaft;
a phase sensor detecting the relative rotational phase; and
a load sensor detecting a load applied to an output transmission system from the crankshaft; and
wherein the controlling section controls the electrically powered actuator, based on detection results of the rotational speed sensor, the phase sensor and the load sensor, when it is determined from a result of detection of the rotational speed sensor that a rotational speed per unit time of the crankshaft is below a set value.

4. The control unit for an internal combustion engine of claim 1, wherein the controlling section retards the opening timing of the exhaust valve from a predetermined timing by the retarding operation of the valve opening/closing timing control apparatus.

\* \* \* \* \*